April 4, 1967  R. A. BEGHETTO, JR  3,312,436
VESSEL HOLDER
Filed July 9, 1965
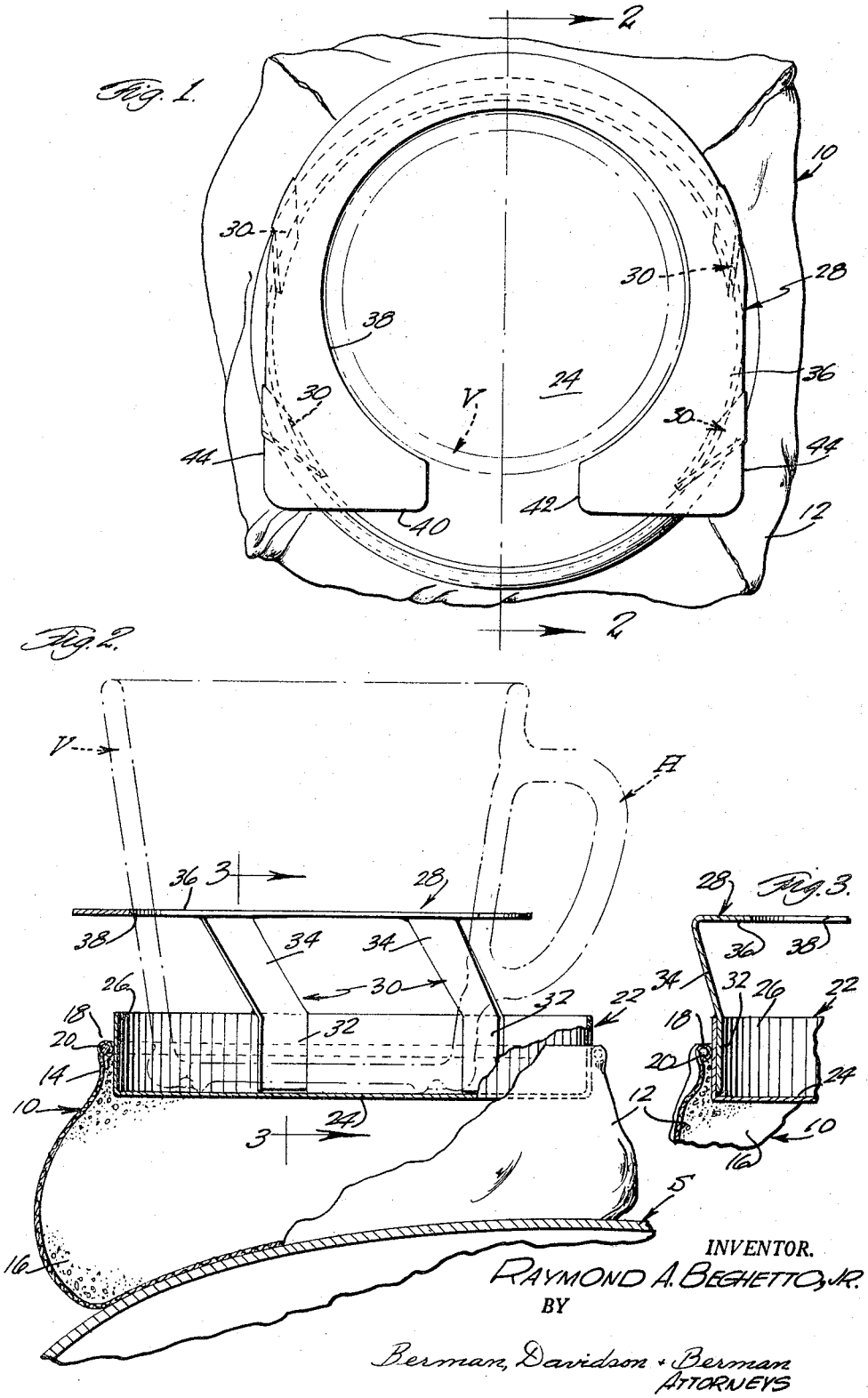
INVENTOR.
RAYMOND A. BEGHETTO, JR.
BY
Berman, Davidson & Berman
ATTORNEYS

3,312,436
VESSEL HOLDER
Raymond A. Beghetto, Jr., 113 W. 6th Ave.,
Cheyenne, Wyo. 82001
Filed July 9, 1965, Ser. No. 470,855
6 Claims. (Cl. 248—148)

This invention relates to vessel holders, and more particularly to a holder, for drinking vessels, such as handle equipped cups, and the like, incorporating a base which is conformable to regularly or irregularly contoured supporting surfaces.

The primary object of the invention is the provision of a simple, practical, and efficient device of the kind indicated, which provides reliable and safe support for vessels, and in particular, for handle equipped vessels, such as coffee cups, whereby the concern felt by hostesses and individuals over the danger of spillage in serving beverages, with resultant embarrassment and damage to furniture and rug, can be eliminated.

Another object of the invention is the provision of a device of the kind indicated above whose base is in the form of a flexible bag containing a deformable filling, of such as sand or gravel, which is readily deformed and conformed to the contours of supports, such as chair or sofa arms and the like, and which has sufficient weight to reliably maintain such conformance.

A further object of the invention is the provision of a device of the character indicated above, wherein an impervious receptacle, larger in diameter than vessels contemplated to be accommodated by the device and designed to harmlessly receive spills and overflows from vessels, has secured thereto an upstanding guard, the guard being formed with an opening accommodating the body of a vessel and having provision for accommodating the handle of the vessel, whereby unsafe sliding of the vessel, relative to the device, is precluded, as when carrying the device and a vessel from a serving area to a guest.

In the drawings:

FIGURE 1 is a top plan view of a device of the invention;

FIGURE 2 is a transverse vertical section, taken on the line 2—2 of FIGURE 1, and showing in phantom lines, a coffee cup engaged in the device, the base being conformed to the surface of a support; and, FIGURE 3 is a fragmentary vertical transverse section taken on the line 3—3 of FIGURE 2.

Referring in detail to the drawings, the illustrated device comprises a conformable base 10, in the form of a flexible, relatively flat bag 12, having a centered, reduced diameter opening, in its upper end, which is bounded by an upstanding circular side wall 14. The bag 12 has a filling 16 of comminuted, weighty material, such as sand or gravel.

The bag side wall 14 is formed, around its upper edge, with a tubular bead 18, which encloses an annular rigid ring 20, preferably of metal or plastic material, which serves to reinforce the side wall 14, and to preserve the circular form of the side wall.

Preferably removably telescoped into the side wall 14, for easy removal from the base 10, for emptying and cleaning, is a circular pan-shaped receptacle 22, of rigid impervious material, such as metal or plastic material. The receptacle 22 has a flat bottom wall 24, adapted to rest upon and flatten and indent the top of the filling 16 of the bag 10, on a level below the side wall bead 18. A perpendicular peripheral side wall 26 is fixed to and rises from the bottom wall 24 and extends above the bead 18, the receptacle side wall 26 being of an outside diameter to be telescopically and frictionally engageable into the bead 18.

The receptacle 22 is provided with an upstanding vessel guard 28, for a vessel, such as a coffee cup V, resting upon the receptacle bottom wall 24, and having a radial handle H.

The guard 28 comprises circumferentially spaced uprights 30, fixed to and upstanding from the receptacle side wall 26, these uprights preferably being four in number, and located in spaced pairs, at diametrically opposite sides of the receptacle 22. As shown in the drawings, the uprights 30 preferably comprise flat rigid strips, of metal or plastic material, having perpendicular lower portions 32, of the depth of and suitably fixed to the inner surface of the receptacle side wall 26, and upper portions 34 extending above the side wall 26.

As clearly shown in FIGURES 2 and 3, the upper portions 34 of the pairs of uprights 30 are disposed at acute upward angles, relative to the receptacle 22, and slant upwardly toward the same side of the receptacle. These uprights are also laterally outwardly and upwardly angled, relative to the receptacle side wall 26, so that, at their upper ends, the upper portions 34 of the uprights reach laterally outwardly, relative to the receptacle side wall 26.

Secured to or integrally formed on the upper ends of the upper portions 34 of the uprights 30, is a flat, horizontal, generally U-shaped guard plate 36, which is formed with a circular vessel accommodating opening 38. The opening 38 is eccentric with respect to the center of the receptacle 22, and is offset toward the same side of the receptacle, as the upper portions 34 of the uprights 30. This offsetting of the opening 38 is provided, so that the radial handle H of the coffee cup V, when the cup is seated in the opening 38, will not project awkwardly and unsafely, beyond the adjacent side of the receptacle 22.

The guard plate 36 is formed, through its squared, chordally arranged end 40, with a slot 42, which is disposed radially to the opening 38, is centered relative to the straight side edges 44, of the plate 36, and is of a width to freely but retainably receive the cup handle H.

As shown in FIGURE 2, the device is adapted to be safely and securely supported on an irregular supporting surface S, simply by imposing the base 10 thereof, so that the bag 12 conforms to the surface S, with the receptacle 22 in a horizontal position.

What is claimed is:

1. A device of the character described, comprising a pan-shaped receptacle having a bottom wall and an upstanding side wall, a vessel receiving guard supportably engaged on the receptacle and upstanding therefrom, said guard having a horizontal guard plate spaced above the receptacle, said guard plate being formed with a vessel accommodating opening which is eccentrically-located relative to the receptacle, and a base upon which the receptacle is removable mounted.

2. A device according to claim 1, wherein said opening is offset relative to the center of the receptacle toward one side of the receptacle, said guard plate being formed with a radial vessel handle accommodating slot extending to said opening, said slot being located in the guard plate at a point remote from said one side of the receptacle.

3. A device according to claim 1, wherein said base comprises a flexible bag containing a filling of deformable weighty material.

4. A device according to claim 1, wherein said guard comprises uprights spaced around and secured to the receptacle side wall, said uprights having upper portions which are angled upwardly and laterally outwardly relative to the side wall of the receptacle, said guard plate being fixed on the upper ends of the uprights.

5. A device according to claim 1, wherein said base comprises a flexible bag containing a filling of deformable material, said bag having an open upper end, an upstanding side wall surrounding said open upper end, said receptacle being removably telescoped into the bag side wall and resting upon the filling of deformable material.

6. A device according to claim 1, wherein said base comprises a flexible bag containing a filling of deformable weighty material, said bag having an open upper end, an upstanding side wall surrounding said upper end, the bag side wall having a hollow bead around its upper edge, and a relatively rigid ring enclosed within said bead, the receptacle being telescoped into the bag side wall and resting upon the bag filling.

References Cited by the Applicant
UNITED STATES PATENTS

| | | | |
|---|---|---|---|
| 2,219,974 | 10/1940 | Bellow | 220—69 |
| 2,307,882 | 1/1943 | Freud et al. | 220—23.4 |
| 2,806,131 | 9/1957 | Palmer | 240—1.2 |
| 2,926,879 | 3/1960 | Dietrich | 248—311 |

CLAUDE A. LE ROY, *Primary Examiner.*

J. F. FOSS, *Assistant Examiner.*